(12) United States Patent
Stoeckle et al.

(10) Patent No.: US 10,266,190 B2
(45) Date of Patent: Apr. 23, 2019

(54) CONTAINER

(71) Applicant: WANZL METALLWARENFABRIK GMBH, Leipheim (DE)

(72) Inventors: Dieter Stoeckle, Landensberg (DE); Paul Ruf, Eppishausen (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 0 days.

(21) Appl. No.: 15/550,163

(22) PCT Filed: Mar. 10, 2016

(86) PCT No.: PCT/EP2016/055123
§ 371 (c)(1),
(2) Date: Aug. 10, 2017

(87) PCT Pub. No.: WO2017/001063
PCT Pub. Date: Jan. 5, 2017

(65) Prior Publication Data
US 2018/0043915 A1 Feb. 15, 2018

(30) Foreign Application Priority Data
Jun. 29, 2015 (DE) .................. 10 2015 110 433

(51) Int. Cl.
*B62B 1/20* (2006.01)
*B62B 1/00* (2006.01)
(Continued)

(52) U.S. Cl.
CPC .............. *B62B 1/006* (2013.01); *B62B 1/125* (2013.01); *B62B 5/067* (2013.01); *B62B 2501/065* (2013.01)

(58) Field of Classification Search
CPC ........... B62B 1/006; B62B 1/12; B62B 1/125; B62B 5/06; B62B 5/067; B62B 2501/065
(Continued)

(56) References Cited
U.S. PATENT DOCUMENTS 7,494,136 B2 * 2/2009 Alves ...................... A45C 3/04
280/33.991
8,567,809 B2 * 10/2013 White ..................... B62B 5/067
280/35
(Continued)

FOREIGN PATENT DOCUMENTS

| EP | 1834539 A1 | 9/2007 |
| EP | 2412606 A1 | 2/2012 |

(Continued)

OTHER PUBLICATIONS

ISA European Patent Office, International Search Report Issued in Application No. PCT/EP2016/055123, dated May 20, 2016, WIPO, 6 pages.

*Primary Examiner* — John D Walters
(74) *Attorney, Agent, or Firm* — McCoy Russell LLP

(57) ABSTRACT

The invention relates to a container having a base and a peripheral lateral wall which adjoins the base. The base and the lateral wall delimit an inner region of the container, and the container is designed in a rollable manner. The container additionally has a pull handle with a guide rail and a handle, and a guide tunnel is provided in a region of the lateral wall for guiding and at least partly receiving the guide rail of the pull handle. The guide rail has at least one latching element which is lifted out of an outer surface of the guide rail and prevents the guide rail from being completely pulled out of the guide tunnel in the assembled state of the pull handle.

20 Claims, 21 Drawing Sheets

(51) Int. Cl.
*B62B 5/06* (2006.01)
*B62B 1/12* (2006.01)

(58) Field of Classification Search
USPC ........................................... 280/47.26
See application file for complete search history.

(56) References Cited

U.S. PATENT DOCUMENTS

2008/0073865 A1 3/2008 Alves et al.
2012/0160886 A1* 6/2012 Henny ................... B62B 1/14
224/411

FOREIGN PATENT DOCUMENTS

| | | |
|---|---|---|
| EP | 2167366 B1 | 3/2013 |
| EP | 2873587 A1 | 5/2015 |
| ES | 2352776 A1 | 2/2011 |
| FR | 2906212 A1 | 3/2008 |
| GB | 2450170 A | 12/2008 |
| WO | 2009151348 A1 | 12/2009 |
| WO | 2014118414 A1 | 8/2014 |

* cited by examiner

A-A (1)

CONTAINER

CROSS-REFERENCE TO RELATED APPLICATIONS

The present application is a U.S. National Phase of International Patent Application Serial No. PCT/EP2016/055123, entitled "CONTAINER," filed on Mar. 10, 2016. International Patent Application Serial No. PCT/EP2016/055123 claims priority to German Patent Application No. 102015110433.4, filed on Jun. 29, 2015. The entire contents of each of the above-cited applications are hereby incorporated by reference for all purposes.

TECHNICAL FIELD

The present invention concerns a container, in particular a shopping basket, with a base and a peripheral lateral wall adjoining the base, whereby the base and the lateral wall delimit an inner region of the shopping basket and the shopping basket is rollable.

BACKGROUND AND SUMMARY

Based on the state-of-the-art there are already containers of this sort, in particular shopping baskets are known, which can be drawn by the user behind them by means of a pull handle.

For example, a rollable shopping basket is known from ES 2 352 776 B1, on which a U-shaped pull handle on each of the guide tunnels on the edges is built onto the shopping basket and is fitted on it to be extendable.

In addition, from EP 1 834 539 A1 a rollable shopping baskets, which can be pulled, is known, on which a U-shaped handle with two bars is built on the lateral wall of the shopping basket and is fitted to be extendable.

A rollable shopping basket is known from FR 2 906 212 B1, which has a pull handle with a telescopic, multi-part guide rail, which is also received and mounted in a guide section of the shopping basket.

EP 2 167 366 B1 shows a rollable shopping basket, to which a foldable pull handle is fastened on the upper edge of the lateral wall, which defines the opening of the inner section. This pull handle can be swiveled from a rest position to a pulling position, whereby in the pulling position, the pull handle projects from the shopping basket.

A further rollable shopping basket is known from WO 2014/118414 A1, which has an attachable, U-shaped pull handle.

It is the object of the present invention, to develop a container of the aforementioned type in a favorable manner, in particular to ensure that the assembly of the pull handle onto the container is simplified, to avoid the possibility of a multi-part handle and to be able to avoid subsequent installation steps. In addition, the aim is to lower investment costs and reduce manufacturing costs.

This object is achieved in accordance with the present invention. According to that, a container provision is made so that a base and a peripheral lateral wall which adjoins the base delimit an inner region of the container, where the container is rollable, and further has a pull handle with a guide rail and a handle and whereby in a region of the lateral wall a guide tunnel is provided for guiding and at least partially receiving the guide rail of the pull handle and whereby the guide rail has at least one latching element, which protrudes from an outer surface of the guide rail and in the assembled state of the pull handle prevents complete extraction of the guide rail from the guide tunnel.

The invention is based on the principle that a container such as a shopping basket or its assembly can be appropriately simplified where the guide rail only must be inserted into the guide tunnel during assembly and after insertion a complete removal of the guide rail can be prevented by the provision of at least one latching element. In particular, the guide tunnel or receiving tunnel on the container or shopping basket for the pull handle and the provision of at least one latching element can be constructed so that the assembly of the pull handle is made possible as a single item (one part or multi-part). The pull handle is pressed through by force through the guide tunnel or receiving tunnel on the basket during assembly and is secured after being fed through before removal or before extraction from the guide tunnel by latching with the latching element. So, for example, the convex, outer tunnel wall can temporarily deform when inserting the pull handle and, as soon as the latching element of the handle has passed down through the guide tunnel, this convex, outer tunnel wall springs back and thus permanently blocks the removal of the handle.

By doing so it will be possible, to optionally omit the multi-part structure of the handle and also to avoid subsequent installation steps. In particular, a lowering of investment costs and a reduction in production costs is possible.

It can be provided as a matter of course that the container is stackable.

Furthermore, it can be foreseen that the guide rail is designed in one piece. This simplifies the production of the guide rail.

It is also conceivable that the pull handle is designed in one piece. In this way assembly steps are eliminated relating to the installation of the pull handle and thus the production can also be simplified.

It is also fundamentally possible for the pull handle and guide rail to be separate components. This may be required, for example, if the pull handle is from experience exposed to large loads and as a result the pull handle should be replaced after a certain amount of service life. Easy interchangeability of the pull handle is in one such embodiment, in which the pull handle and guide rail are separate components. The individual parts of the pull handle can be glued, screwed, or clipped on.

For example, it is possible for the pull handle to consist of a separate handle, a guide profile and a latching component, which is passed through the guide tunnel and carries the latching element. The handle and/or the latching component can be designed as plastic parts. The guide rail can be, for example, a plastic part or even a metal component, for example made from an extruded aluminum profile.

It is also possible to make the pull handle from two half-shells and to join them, for example, using ultrasonic welding or laser welding.

In particular, it is conceivable that the container, base, lateral wall and guide rail and handle are designed in plastic.

Thus, the container or basket can be made from polypropylene (PP), in particular they can be formed from unreinforced polypropylene. It is also conceivable to use polyethylene (PE), in particular non-reinforced polyethylene.

The container can be formed as an injection-molded part.

The handle or the pull handle can be made from fiber-reinforced plastic. It is conceivable, for example, that a polyamide (PA) would be selected as the plastic, for example, PA6 or PA66. The fiber reinforcement can be made, for example, using glass fiber. It is particularly conceivable that glass fiber-reinforced PA6 would be used as the starting material. The handle or the pull handle can be designed as an injection-molded part.

The container is designed to be rollable, with two rollers being provided which, for example, can be arranged on the rear side in relation to the driving position of the container. The axle of the roller can be a metal axle. It is conceivable in this context that the axle is the only structural element made of metal on the container.

Furthermore, it is possible for the latching element to be designed as a single piece. As a result, the guide rail can be produced more easily and the corresponding installation steps can be saved.

Furthermore, provision can be made for the latching element to be wedge-shaped. In this context it is particularly conceivable for the latching element to be oriented such that the flattening of the wedge shape of the latching element is oriented in the direction of insertion of the guide rail of the pull handle, so that when inserting the pull handle into the guide tunnel, thanks to its wedge shape the latching element expands the guide tunnel and after the ingress of the latching element through the opening in the guide tunnel, the wall of the guide tunnel springs back again. As a result, the pull handle can no longer be pulled out of the guide tunnel due to the shape of the latching element, since the protruding part of the latching element prevents its removal from the guide tunnel, and the protruding part of the wedge-shaped latching element forms a type of stop or lug, which abuts against the wall of the guide tunnel and thereby prevents an extraction.

It can also be provided that the guide rail has two broad sides with a width which is twice as large as the depth of the guide rail. It is, for example, conceivable that the guide rail has a cross-section that is substantially in an oval or rectangular form. As a result, a comparatively favorable surface moment of inertia of the cross-section is achieved, whereby the guide rail is mechanically stable and also comparatively torsion-resistant and well protected against bending in the direction of the broad sides. Such a design also allows only a single guide rail to be provided, which still provides sufficient stability.

It can also be provided that the latching element is arranged on a broad side. This makes it possible for only a single latching element to be provided. In particular, it is also possible in this context that the latching element is arranged in such a way that the deformation force exerted by the latching element can be distributed comparatively uniformly into the walls of the guide tunnel when the pull handle is inserted into the guide tunnel. This makes a gentle insertion of the pull handle into the guide tunnel possible.

In addition, it is conceivable that at least one latching element is provided on the guide rail, by means of which the pull handle can be engaged in an extended position in the assembled state of the shopping basket. Due to the circumstance that the pull handle can be latched in an extended position in the mounted state of the shopping basket, it is possible to be able not only to pull the shopping basket, but also to push it. This can be of great advantage when maneuvering the shopping basket, especially if the user is within narrow passageways within a shop. By providing an extended position, in which the pull handle can be engaged, the unintentional pushing of the pull handle into the guide tunnel, thereby lowering it again into the guide tunnel, when pushing the container or shopping basket is prevented.

In particular, provision can be made for at least one latching element to be arranged in a spring-loaded manner. In particular, it can be provided that the latching element is arranged on a spring bar. As a result, it is easily possible to lower the pull handle from the latched extended position into the guide tunnel again, namely due to the fact that the spring resistance is overcome.

In particular, it is conceivable in this context that, spring bars are provided on a broad side of the guide rail, parallel to both edges, on each of which a latching element is arranged. Such a latching element can, for example, be wedge-shaped.

In principle, it is also conceivable for the latching element to be embodied in a wedge-shaped, knob-shaped, hemispherical or otherwise suitably shaped manner in any configuration, whether spring-loaded or not.

Furthermore, it can be provided that at least one further latching element is provided, which is arranged without a spring on the guide rail. It is particularly conceivable that the further unsprung latching element is arranged on the guide rail centrally on a broad side, in particular above the latching element. Due to the arrangement on the wide side, it is possible that, as a result of the shape of the latching element, a wall of the guide tunnel is pressed elastically outwards upon insertion of the guide rail in such a way that the pull handle can slide through the guide tunnel into the recessed position of the guide rail. In this context, it is particularly conceivable for the latching element to have two inclined faces which facilitate the extraction of the guide rail from the guide tunnel and the insertion of the guide rail into the guide tunnel.

In addition, it can be provided that the guide tunnel has at least one recess in which the latching element can be engaged. Thanks to this recess, a counterpart can be provided, into which the latching element can engage. As a result, reliable latching can be easily achieved.

It is also conceivable for the guide tunnel to have at least one molding, into which the latching element can be caught. Thanks to the stop on, for example, one edge of the molding, it can be easily achieved that, in the installed state of the pull handle, complete extraction of the guide rail from the guide tunnel can be or is prevented.

Furthermore, provision can be made for a further attachment to be provided, which can be threaded on the pull handle, by means of which an additional basket can be held in place. By means of the additional basket, a larger quantity of goods can be transported with the container where required, since further goods can be placed in the additional basket.

The attachment has, for example, two support arms on which the additional basket can be held. The attachment can be guided with an additional guide tunnel attachment onto the guide rail of the pull handle. In particular, it can be ensured that the guide rail is guided through the guide tunnel.

Furthermore, an attachment rail, which can be clipped onto the guide rail, can be provided, by means of which an additional basket can be held in place. As a result, it is simply possible to subsequently retrofit existing containers, so that the containers can be provided with additional baskets.

Further details and advantages of the invention will now be explained in more detail by means of a design example illustrated in the drawings.

DETAILED DESCRIPTION

Figure 1:
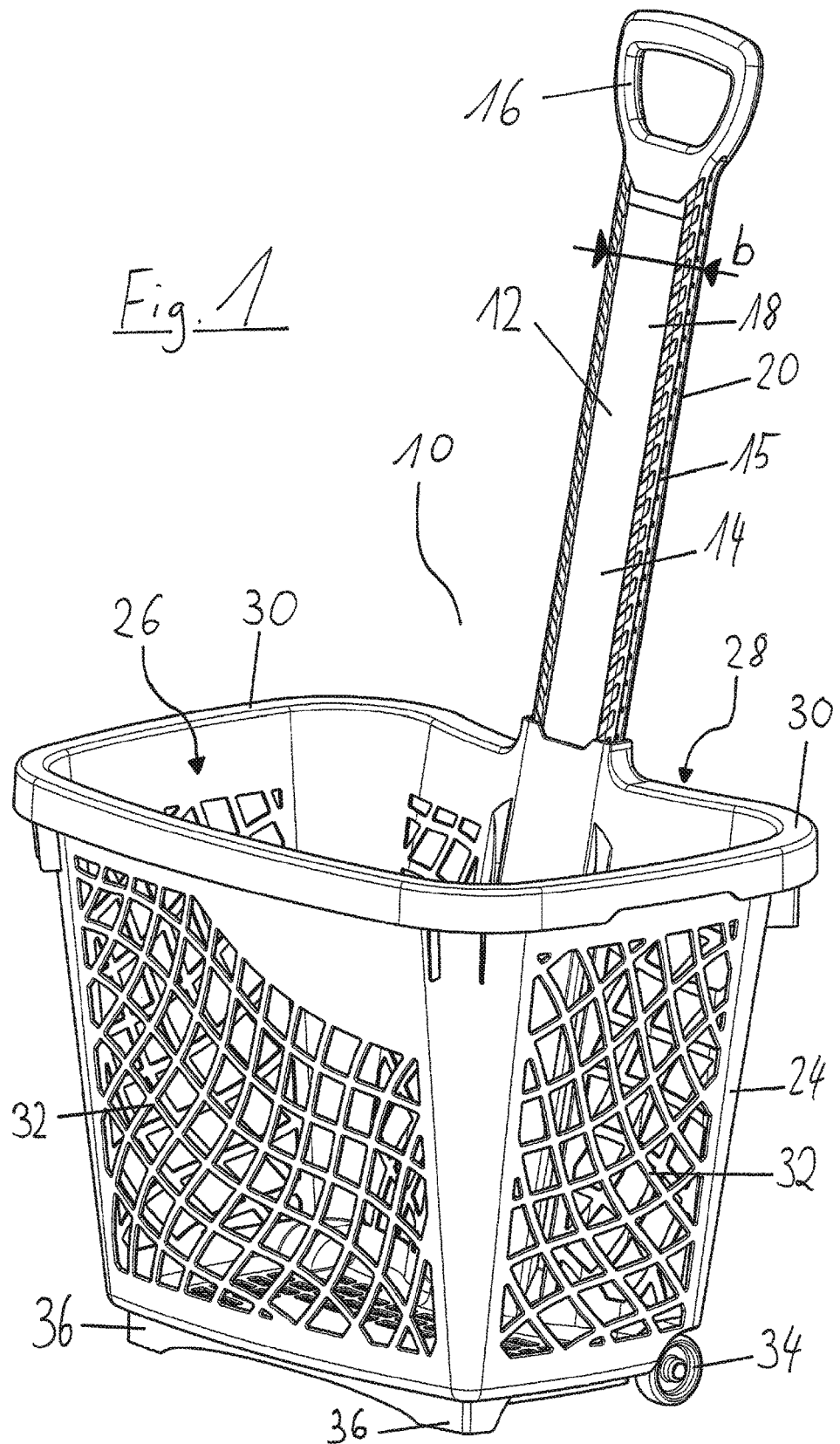
FIG. 1 a design example of a container according to the invention, in this case a shopping basket, in a perspective view.

FIG. 1 shows in perspective container 10 in the design example in accordance with the invention as shopping basket 10 with pull handle 12 in an extended position.

Shopping basket 10 is designed as an injection-molded part, whereby shopping basket 10 is made from unreinforced polypropylene.

Shopping basket 10 is stackable.

Pull handle 12 has a guide rail 14 and a handle 16.

It is fundamentally possible, as in this design example, for the pull handle 12 to be made as a single piece.

In the design example shown here the pull handle 12 is made from glass fiber-reinforced PA6 and as an injection-molded part. Material slots 15 are provided on both sides of the guide rail 14. These material slots 15 serve to avoid material accumulation and to simplify production in the injection-molding process.

Alternatively, it is also possible that the handle 16 and the guide rails 14 are separate components, which can, for example, be stacked inside each other.

It is conceivable that the handle 16 is made in one piece. The guide rails 14 can also be designed in one piece.

Figure 3:
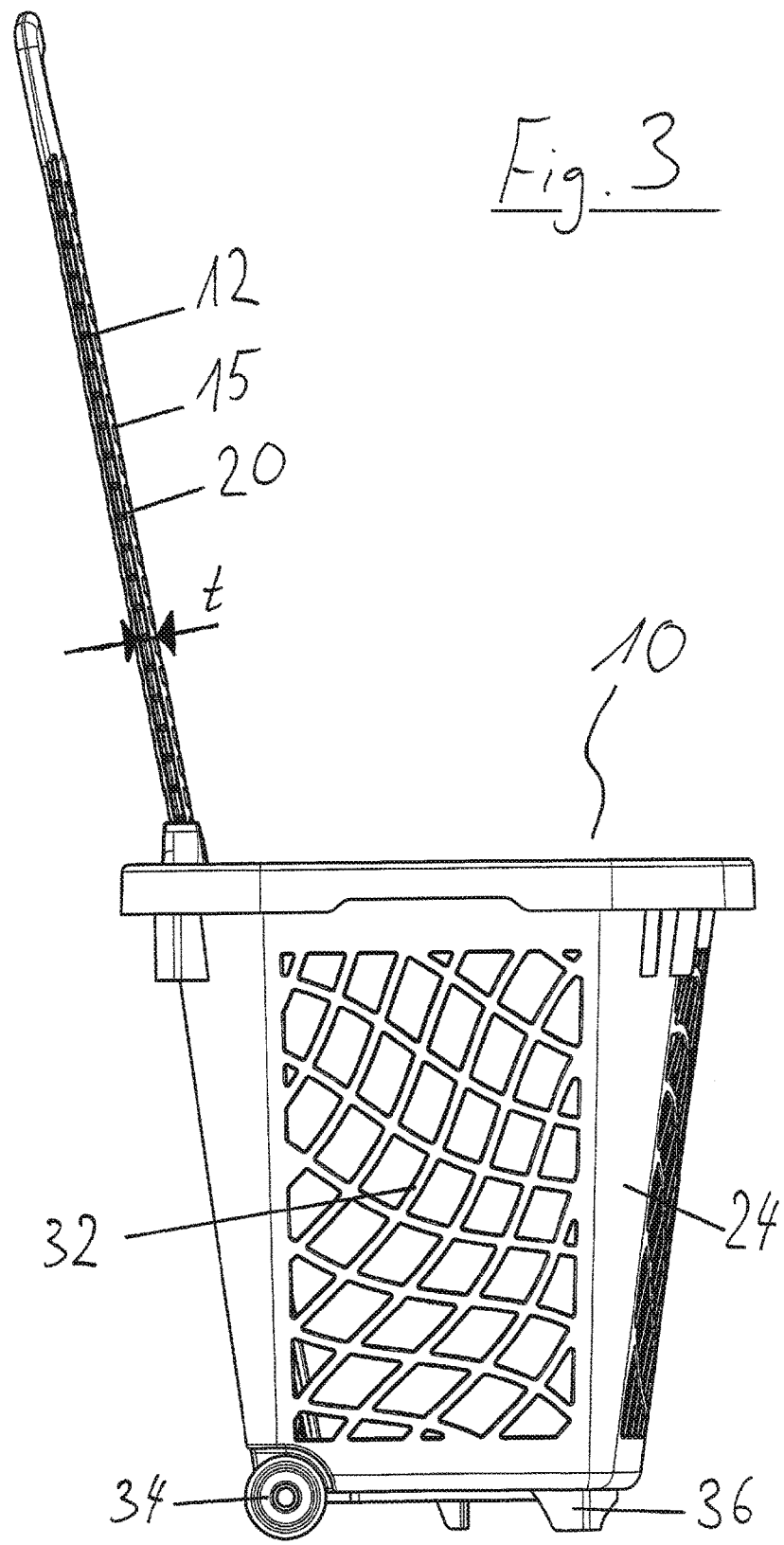
FIG. 3: shows a side view of the shopping basket according to FIG. 1.
Figure 4:
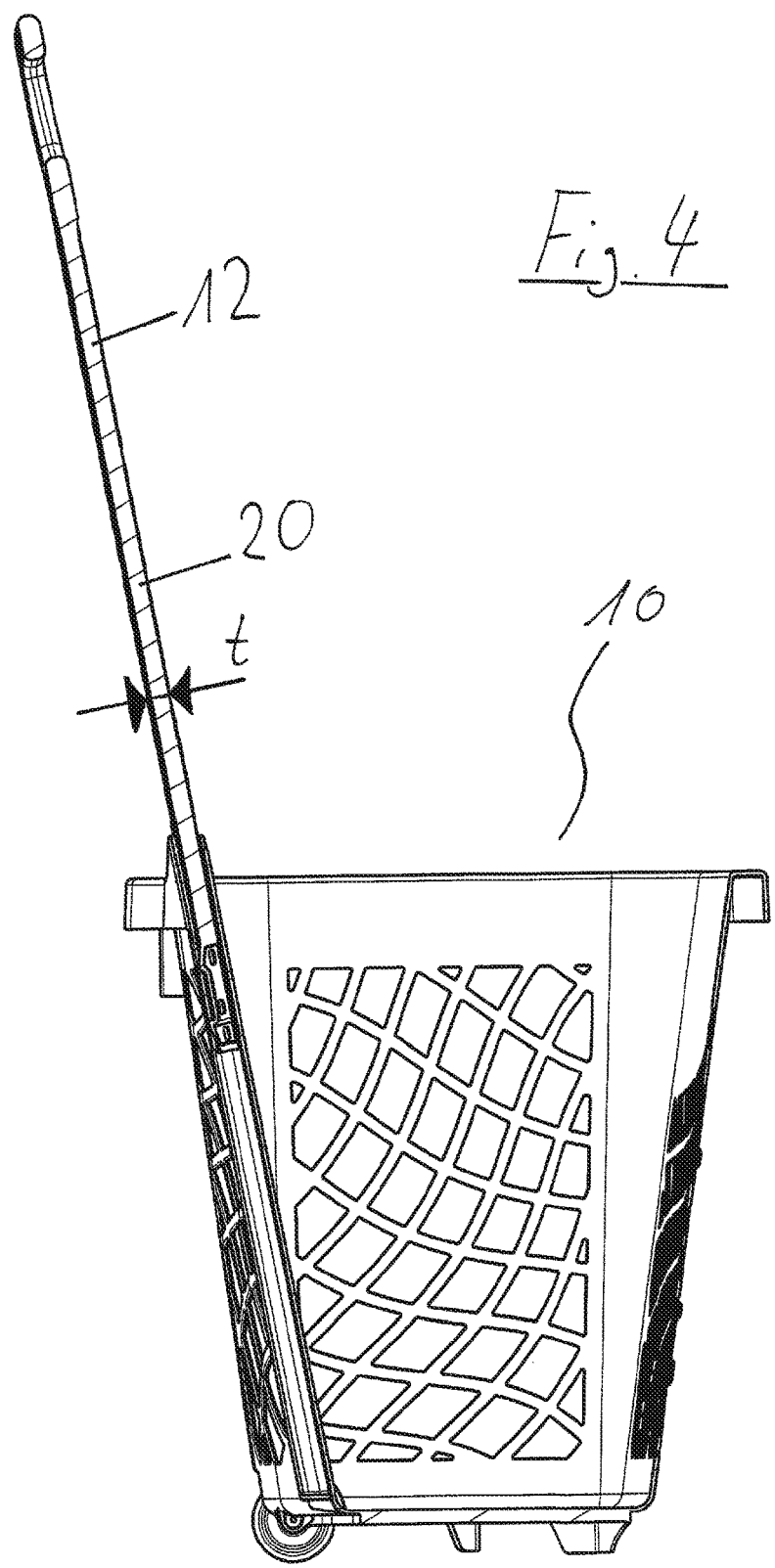
FIG. 4: shows a sectional view through the shopping basket according to FIG. 1.

The cross-section of the guide rail 14 is designed so it has a broad side 18 (front side 18) with a width b (see FIG. 1), and a narrow side 20 with a depth t (see FIG. 3 and FIG. 4).

The broad side 18 or front side 18 can, for example, be imprinted.

Figure 6:
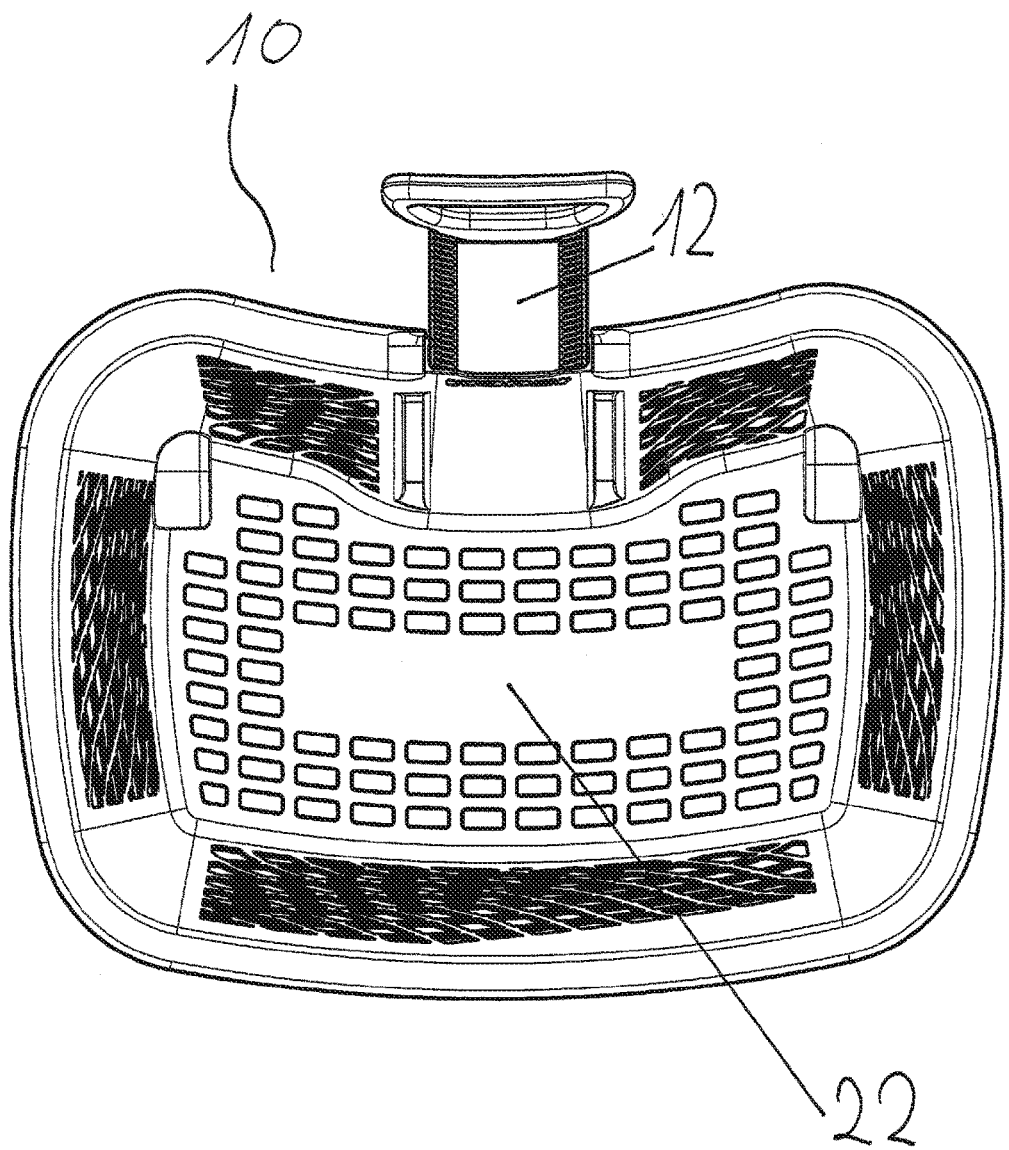
FIG. 6: shows a top view of the shopping basket according to FIG. 1.

The shopping basket 10 also has a base 22 (see FIG. 6), as well as a peripheral lateral wall 24 adjoining the base 22. The base 22 and the peripheral lateral wall 24 delimit an inner region 26 of the shopping basket 10.

The inner region 26 itself is accessible via an opening 28, which is delimited on the opposite side of the base 22 by the edge 30 of the lateral wall 24.

The lateral wall 24 and also the base 22 are provided with lattice structures 32. In principle, it is also conceivable that the lateral wall 24 and/or base 22 are closed.

In the base 22, on the long side of the base 22, rollers 34 are fastened. Supporting ribs 36 are provided on the opposite long side of the base 22.

When not being used, the shopping basket 10 is on the rollers 34 and the supporting ribs 36 and while it is in the driving position it can be rolled on the rollers 34.

In the area of the lateral wall 24, namely in this design example at the edge 30 of the lateral wall 24 on the side of the shopping basket 10, on which the rollers 34 are also arranged, which is also called the back of the shopping basket 10, a guide tunnel 37 is provided for guiding and at least partially receiving the guide rail 14 of the pull handle 12.

In the design example shown in FIG. 1 all the components of the shopping basket 10 are made of plastic, with exception of the axle (not shown in detail) for the rollers 34 on the shopping basket 10. This axle can be, for example, made of steel.

Figure 2:
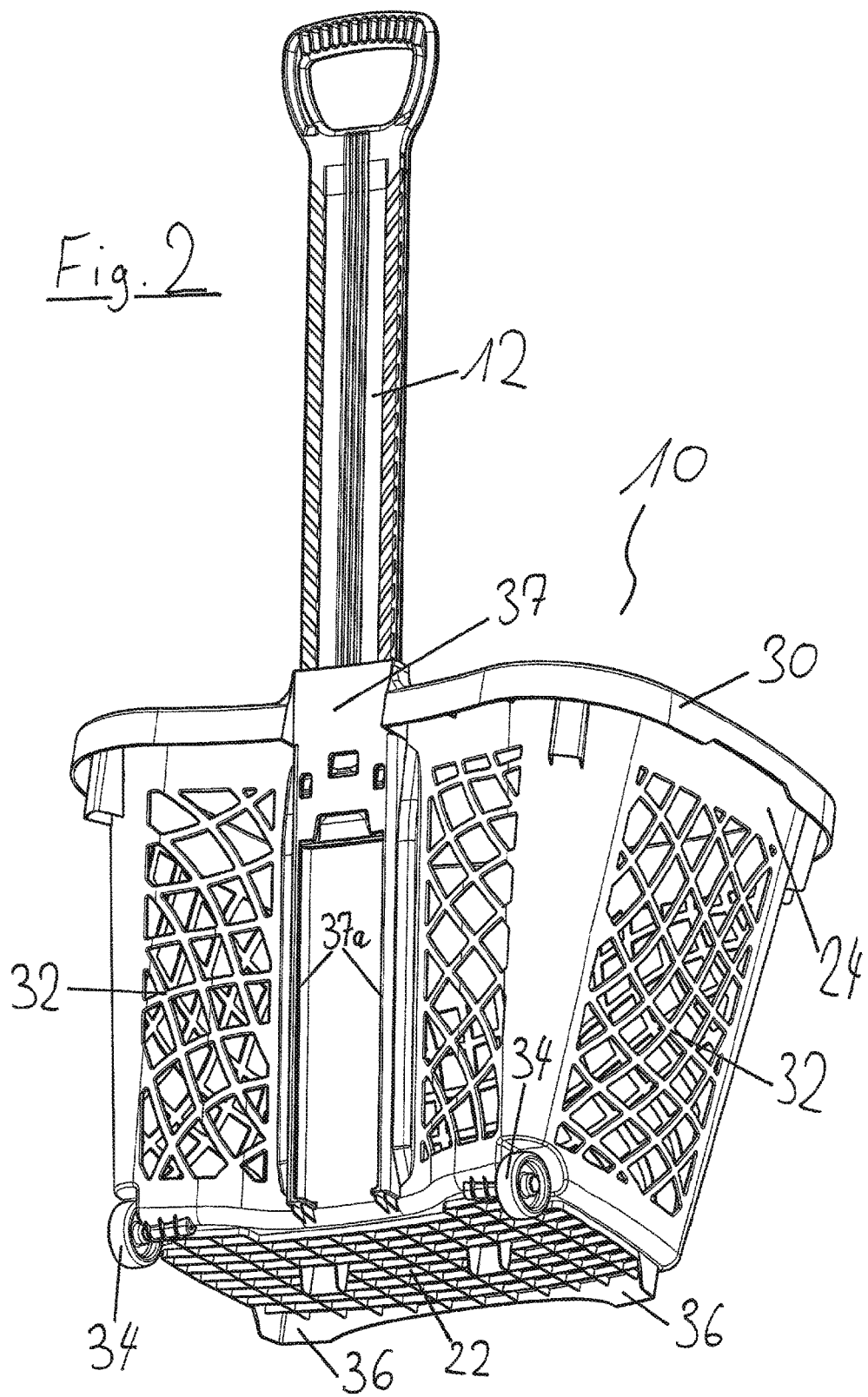
FIG. 2: shows a perspective rear view of the shopping basket according to FIG. 1.

As FIG. 2 also shows, the guide tunnel 37 is arranged on the outside of the back of the lateral wall 24 and is located in the top third or quarter of the back of the lateral wall 24. The length of the guide tunnel 37 is about one-fifth to about a quarter of the height of the lateral wall 24.

Guide ribs 37a join the end of the guide tunnel 37 facing the base 22 at both narrow sides of the guide tunnel, these guide ribs serving to guide the guide rail 14.

Figure 11A:
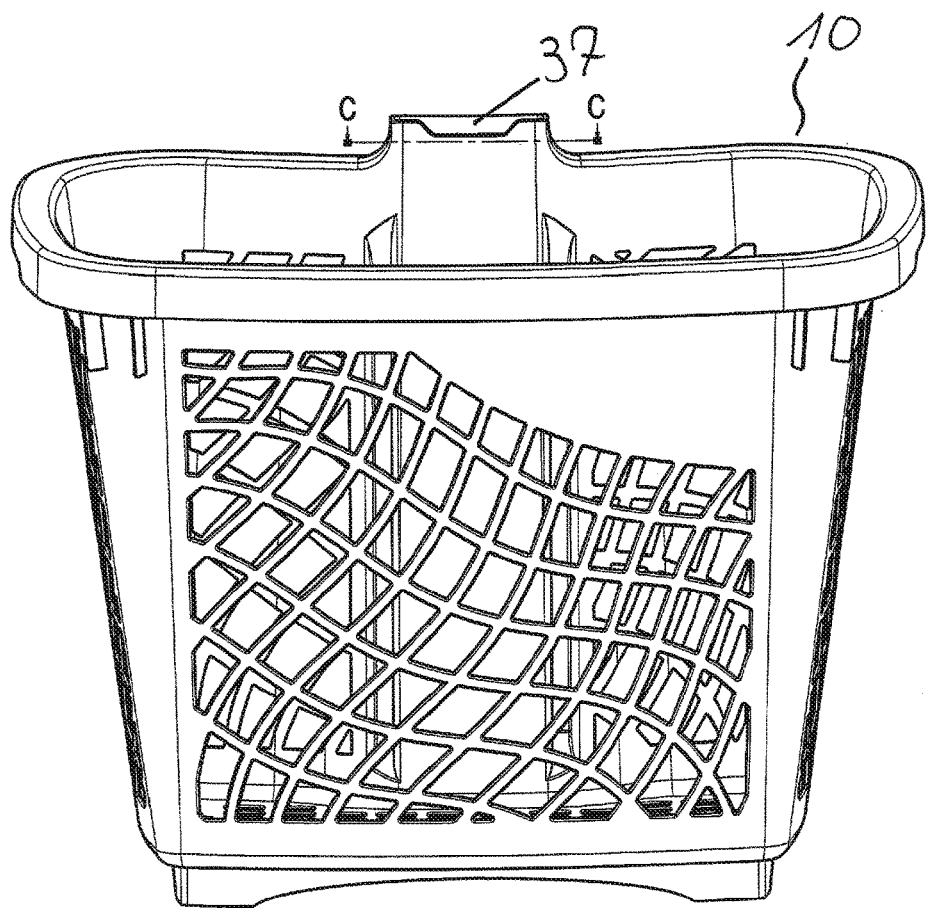
FIG. 11A: shows a front view of the shopping basket showing the section C-C.
Figure 11B:
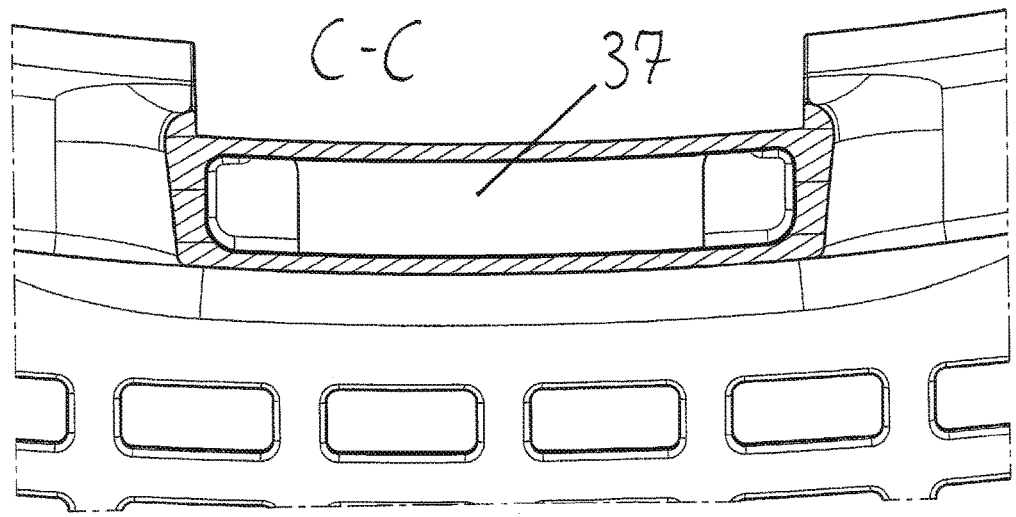
FIG. 11B: shows a sectional view of the section C-C and a top view of the guide tunnel of the shopping basket according to FIG. 1.
Figure 12:
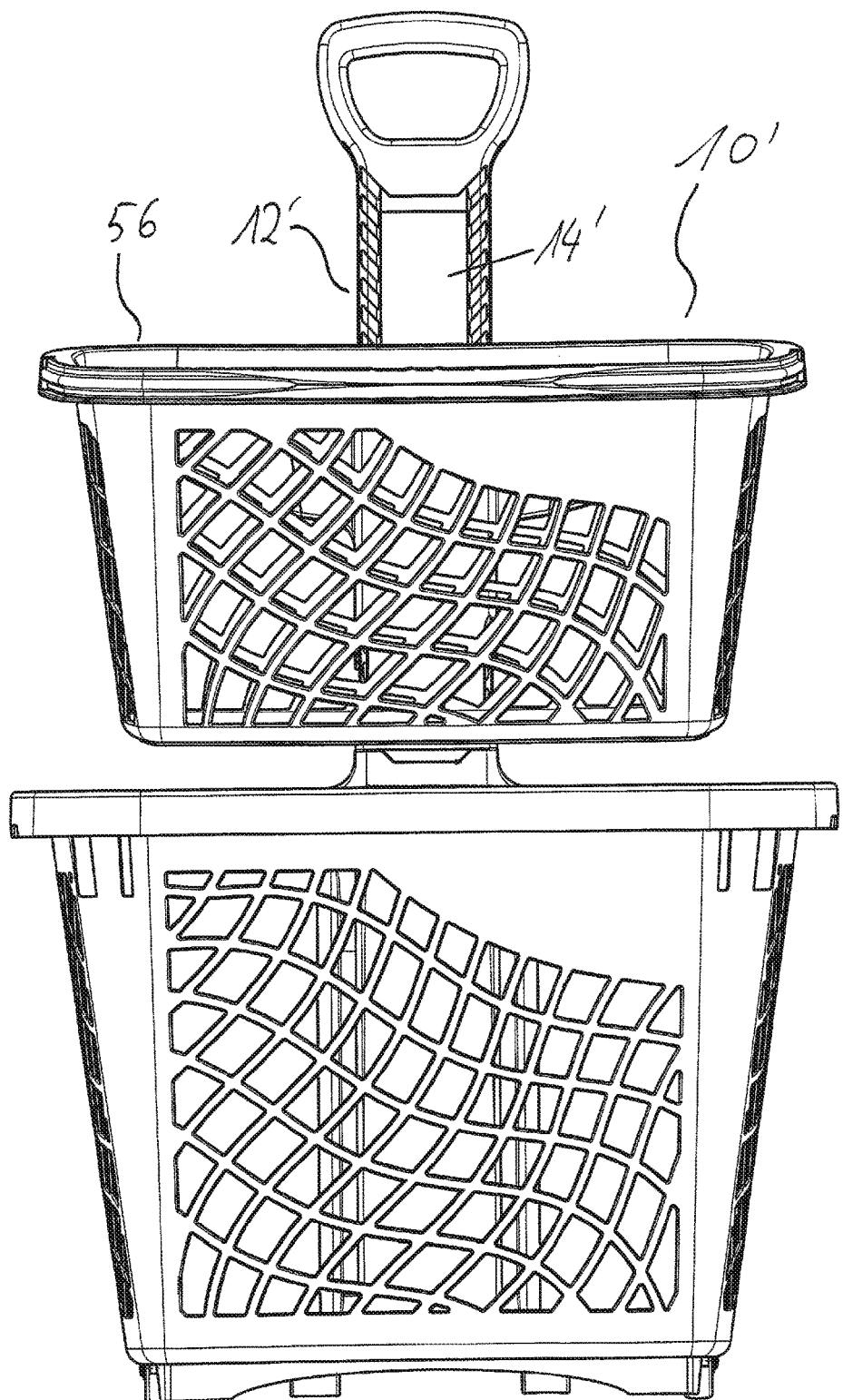
FIG. 12: shows a front view of a further design example of a shopping basket in accordance with the invention.
Figure 13:
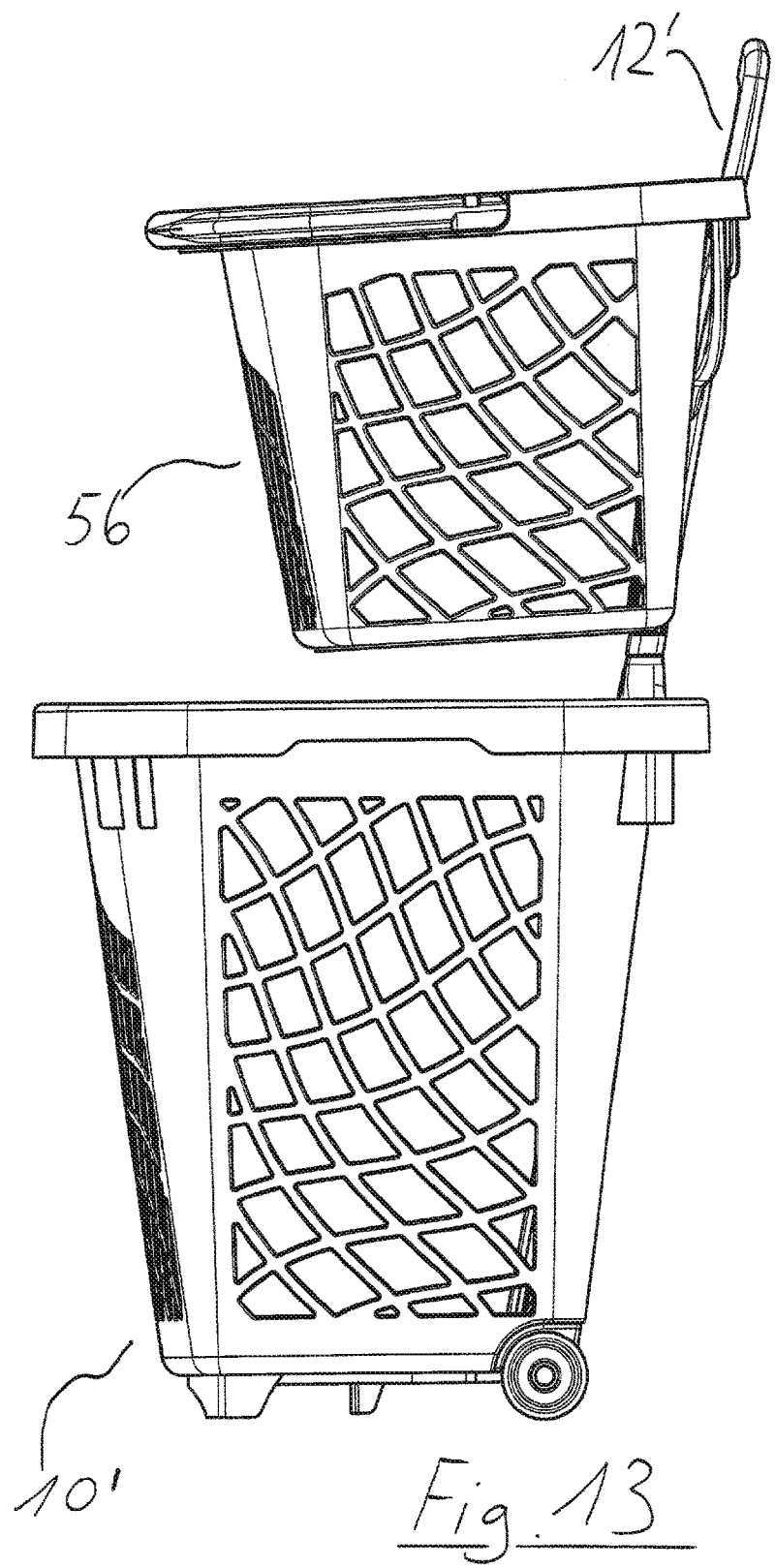
FIG. 13: shows a side view of the shopping basket according to FIG. 12.
Figure 14:
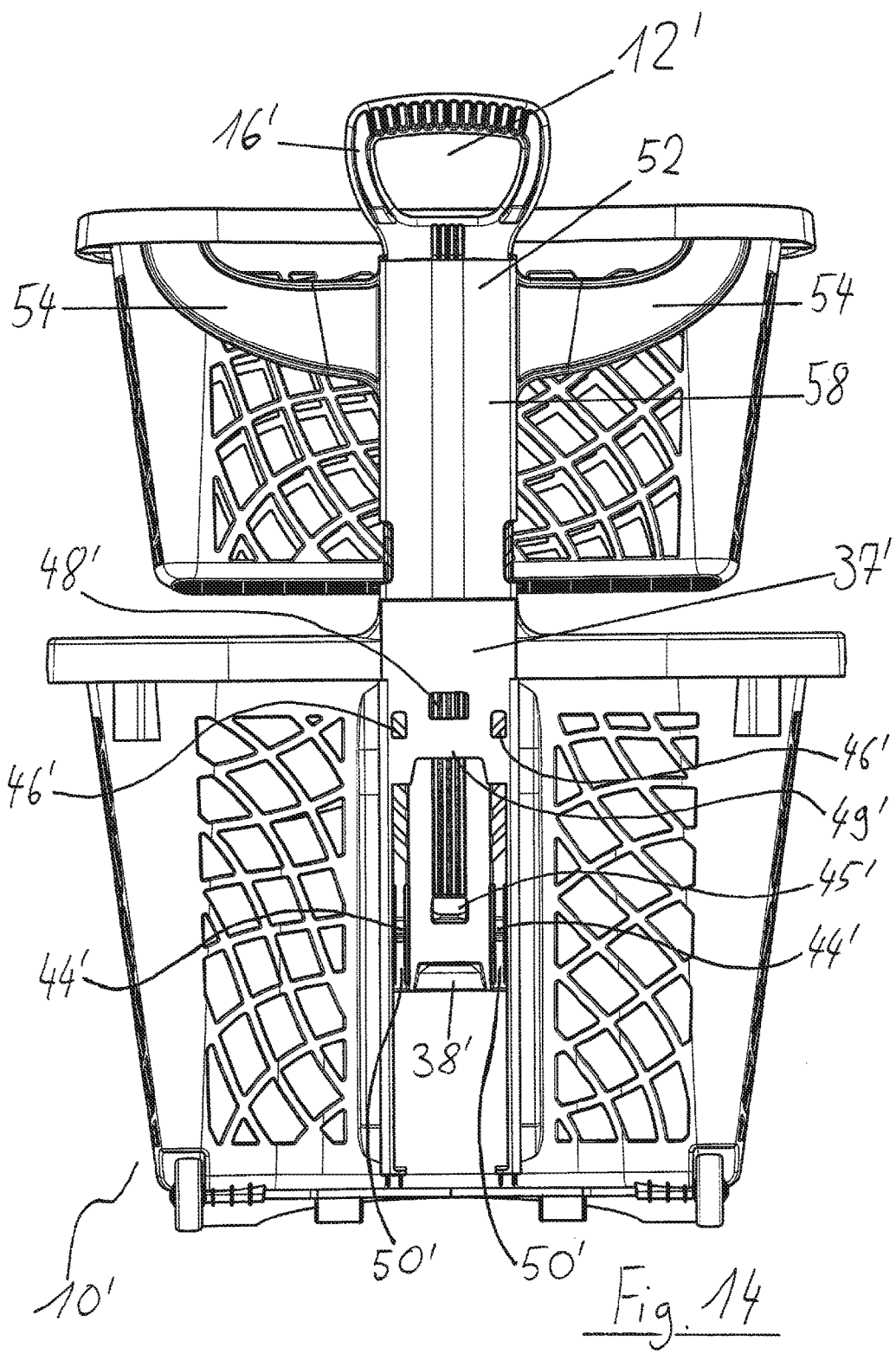
FIG. 14: shows a rear view of the shopping basket according to FIG. 12.

The cross-section of the guide tunnel 37 can be seen in FIG. 11B (see FIG. 11A for section details of this section).

The cross-section of the guide tunnel 37 has a slightly curved or convex shape.

Figure 7:
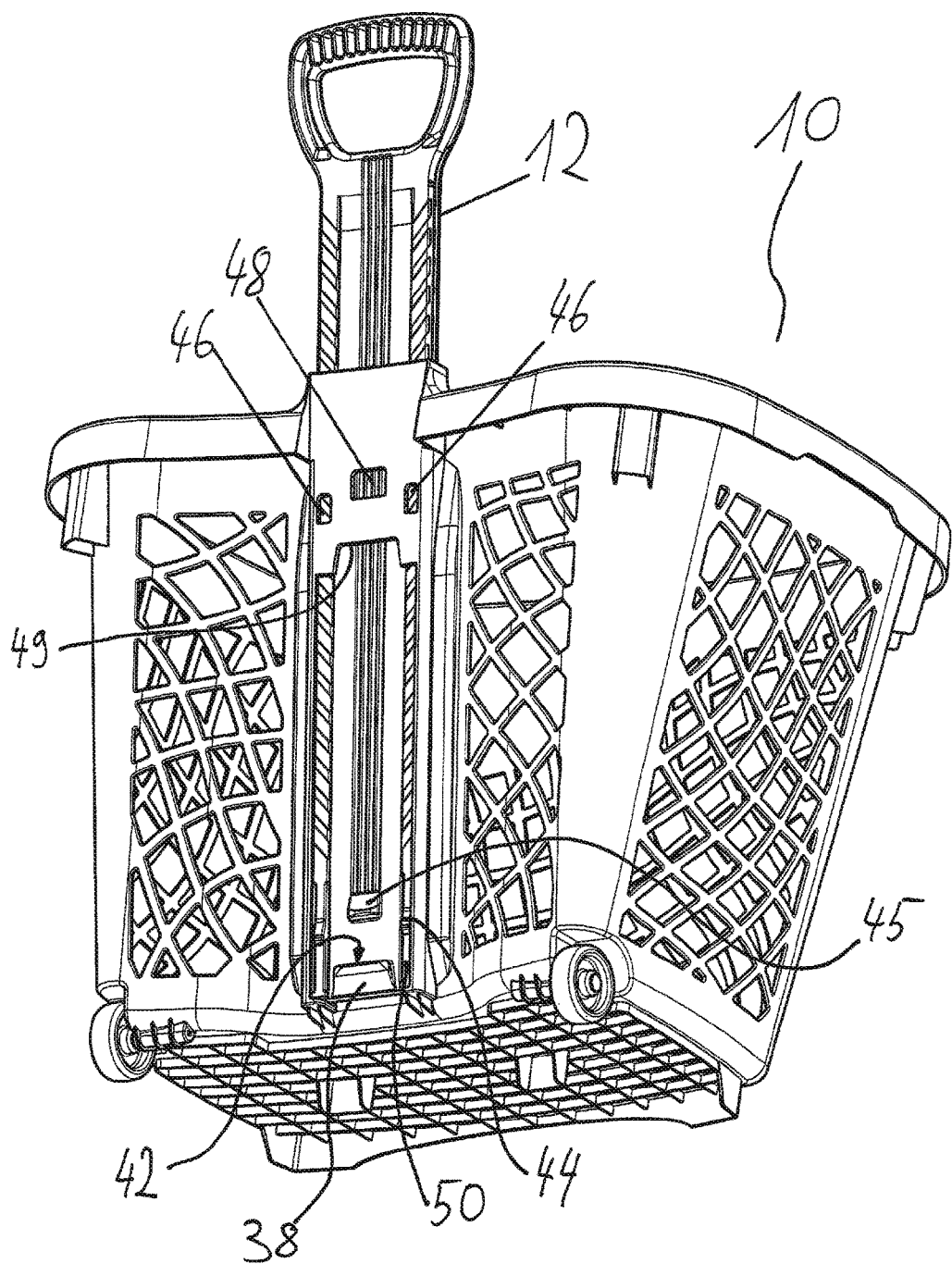
FIG. 7: shows a perspective view of the base of the shopping basket according to FIG. 1.
Figure 8:
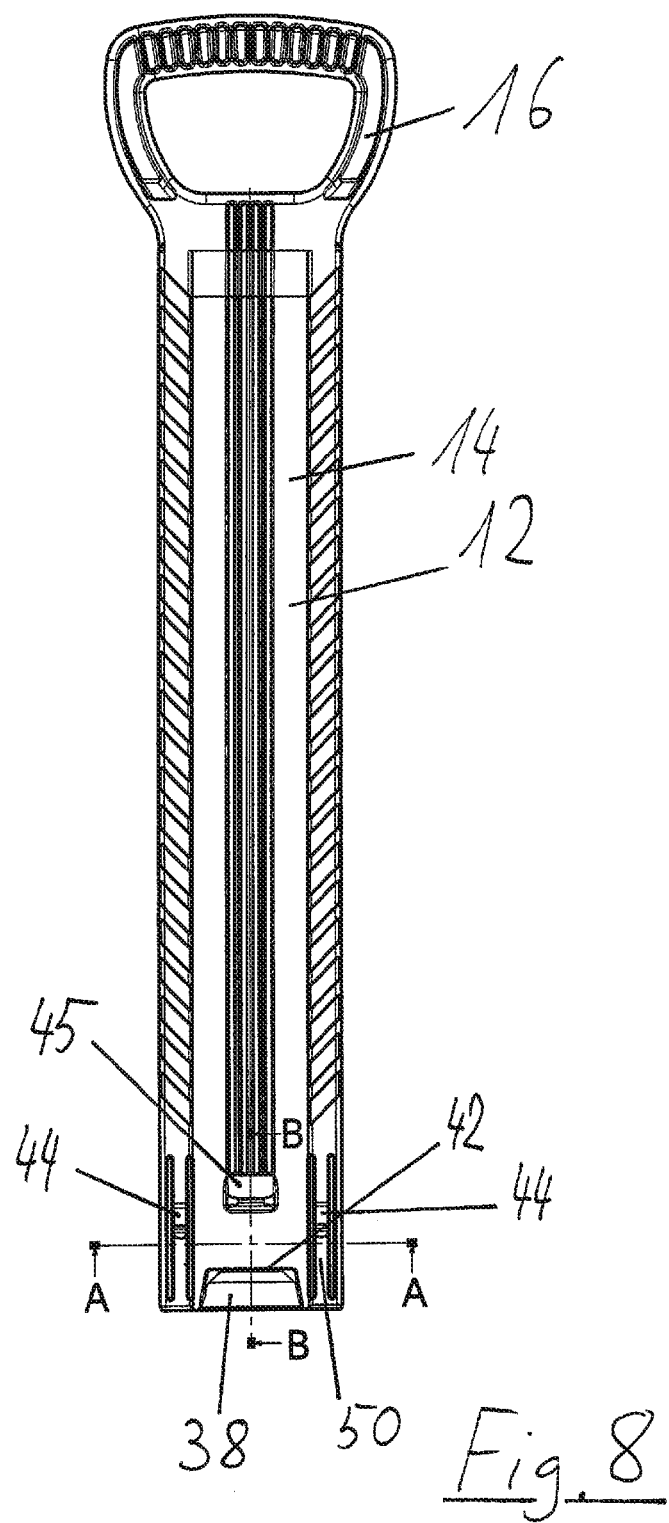
FIG. 8: shows a top plan view of the pulling handle of the shopping basket according to FIG. 1 with illustration of sections A-A and B-B.
Figure 9:
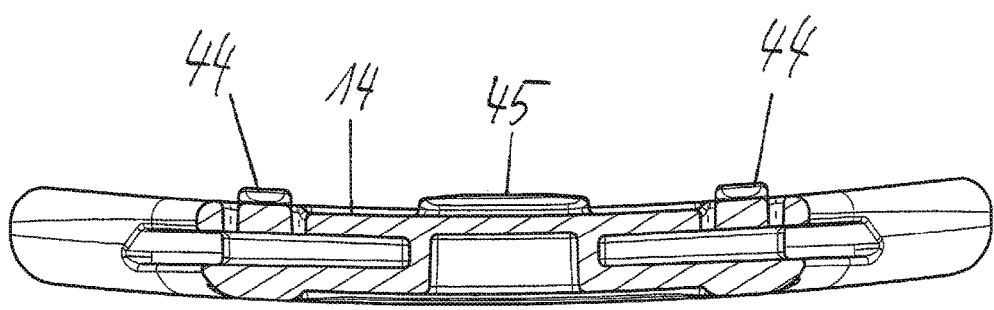
FIG. 9: shows a view of the section A-A through the pull handle of the shopping basket according to FIG. 1.
Figure 10:
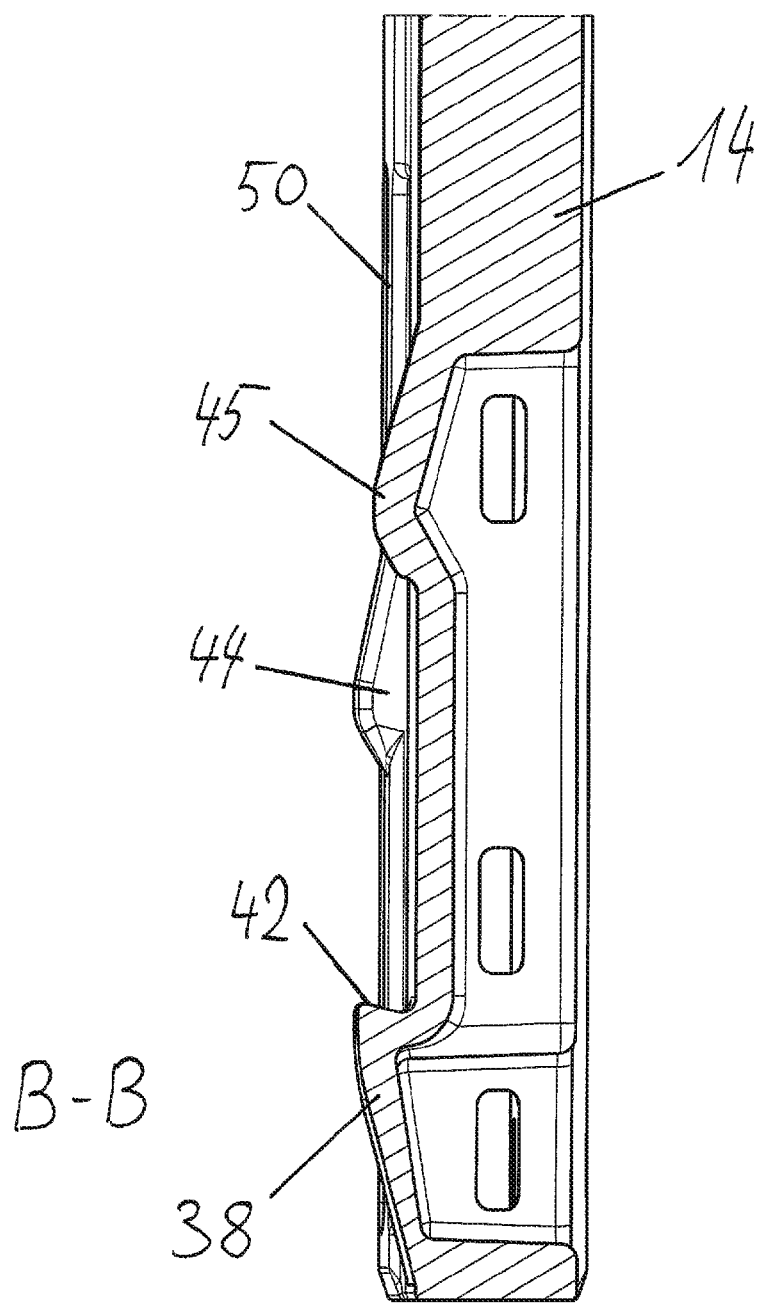
FIG. 10: shows a view of the section B-B through the pull handle of the shopping basket according to FIG. 1.

The guide rail 14 has in its assembled state at the end facing the base 22 (or at the end away from its handle 16) a wedge-shaped latching element 38 (see for example FIG. 5 and FIG. 7), that rises up obliquely from the broad side 18 of the guide rail 14 and in such a way that the highest elevation of the latching element 38 is facing the handle 16 and forms a rest base 42 there. At the end of the latching element 38 away from the handle 16 the sloping surface of the latching element 38 runs in the top surface of the guide rail.

Furthermore, the guide rails 14 has latching elements 44 and 45.

The latching elements 44 are spring-loaded latching elements 44 and are each centrally arranged on spring bar 50.

Further, a non-sprung latching element 45 is provided centrally on the broad side of guide rail 14.

The guide tunnel 37 has as counterparts for the latching elements 44 and 45 the slots 46 and 48, into which the latching elements 44 and 45 can be engaged.

In addition, the guide tunnel 37 has a molding 49 as a counterpart or a stop for the locking element 38, on which the latching element 38 can be caught.

The function of the locking element 38 can be described as follows:

When inserting the pull handle 12, the latching element 38 presses the outer wall of the guide tunnel 37 outward, so that the guide rail 14 and the latching element 38, which have a larger cross-section than the opening cross-section of the guide tunnel 37, can enter through the guide tunnel 37.

After the latching element 38 passes through, the wall of the guide tunnel 37 that is pressed outwards springs back again and so in the assembled position of the pull handle 12 complete removal of the guide rail 14 from the guide tunnel 37 is prevented.

That is, if in the fully assembled position the guide rail 14 is pulled by the withdrawal of the pull handle 12 from the guide tunnel 37 against the guide tunnel 37, the latching element 38 pushes against the molding 49 of the guide tunnel 37 and prevents a complete removal of the pull handle 12.

In the contact area, the latching element 38 is provided with an area parallel to molding 49, which is wedge-shaped. As a result, an additional clamping effect can be achieved so that the pulling forces on the pull handle 12 can be increased, so that pull handle 12 and guide tunnel 37 are clamped together even more effectively.

In this extended position (for the extended position see, for example, FIG. 5) the pull handle 12 is latched in the slots 46 and 48 via the latching elements 44 and 45, so that the guide rail 14 is stably secured in this position against inadvertently sliding back into the guide tunnel 37 or is latched. To insert back in again, the spring resistance of the both spring bars 50, as well as the spring resistance of the convex outer wall of the guide tunnel 37, must be overcome, because in this case the latching element 45 is engaged in slot 48.

Due to the curved or convex shape of the cross-section of the guide tunnel 37 the wall of the guide tunnel 37, also called the back of the guide tunnel 37, acts as a leaf spring with the slots 46 and 48. This is particularly advantageous for the realization of the latch and snap-action system of the shopping basket 10.

This shopping basket 10 can not only be pulled, but also pushed.

In FIGS. 2 to 11 further views of the shopping basket 10 are shown as described above. The section view in FIG. 4, as well as the representation of the sections A-A and B-B (for section information see FIG. 8) shows in FIGS. 9 and 10 in detail, how the latching element 38 as well as the snap elements 44 and 45 are built.

In FIGS. 12 to 16 a further design example of a shopping basket 10' according to the invention is shown, which has all the structural and functional features of shopping basket 10, as well as their advantages.

Figure 15:
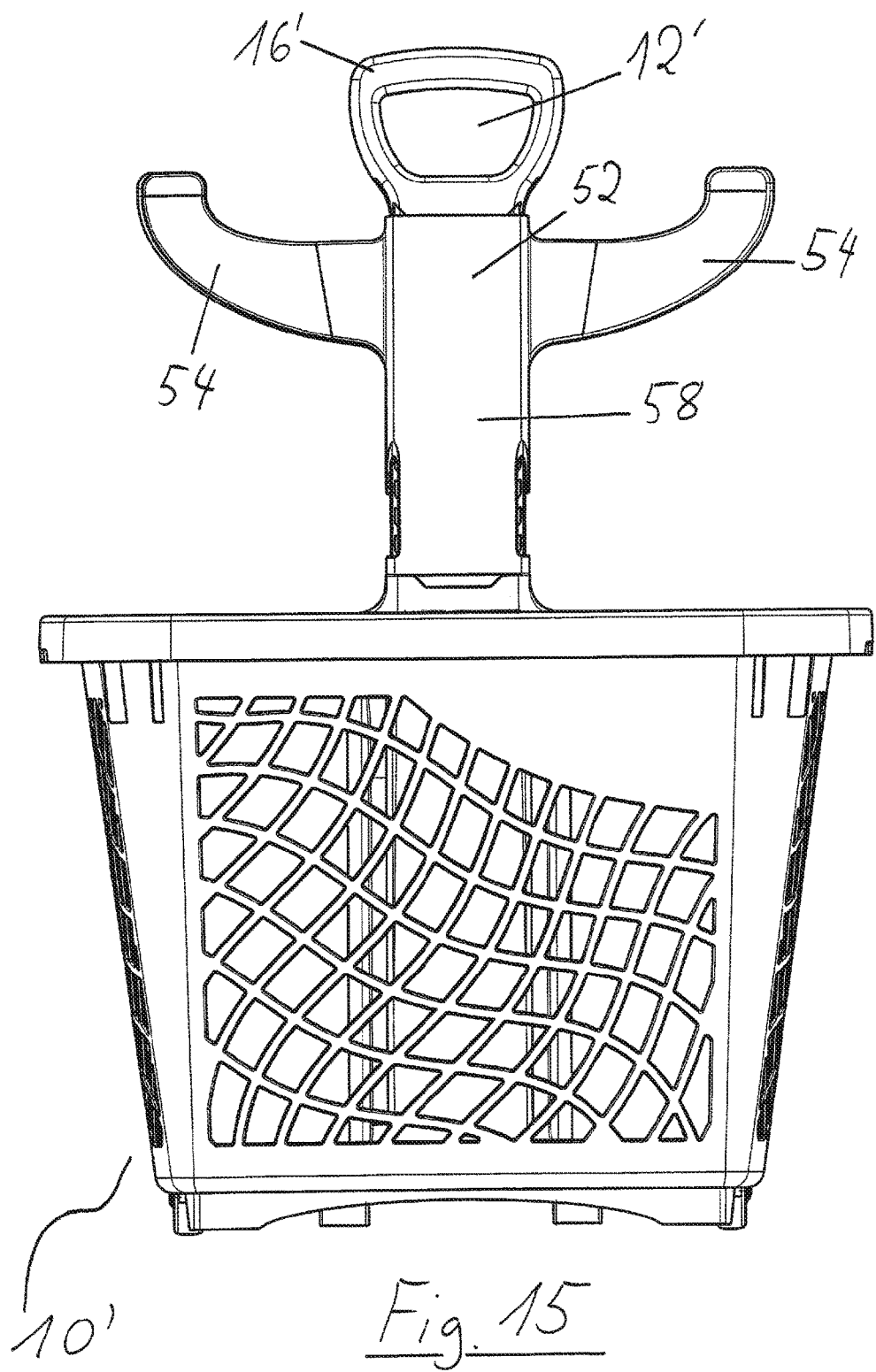
FIG. 15: shows a further front view of the shopping basket according to FIG. 12 without an additional basket.
Figure 16:
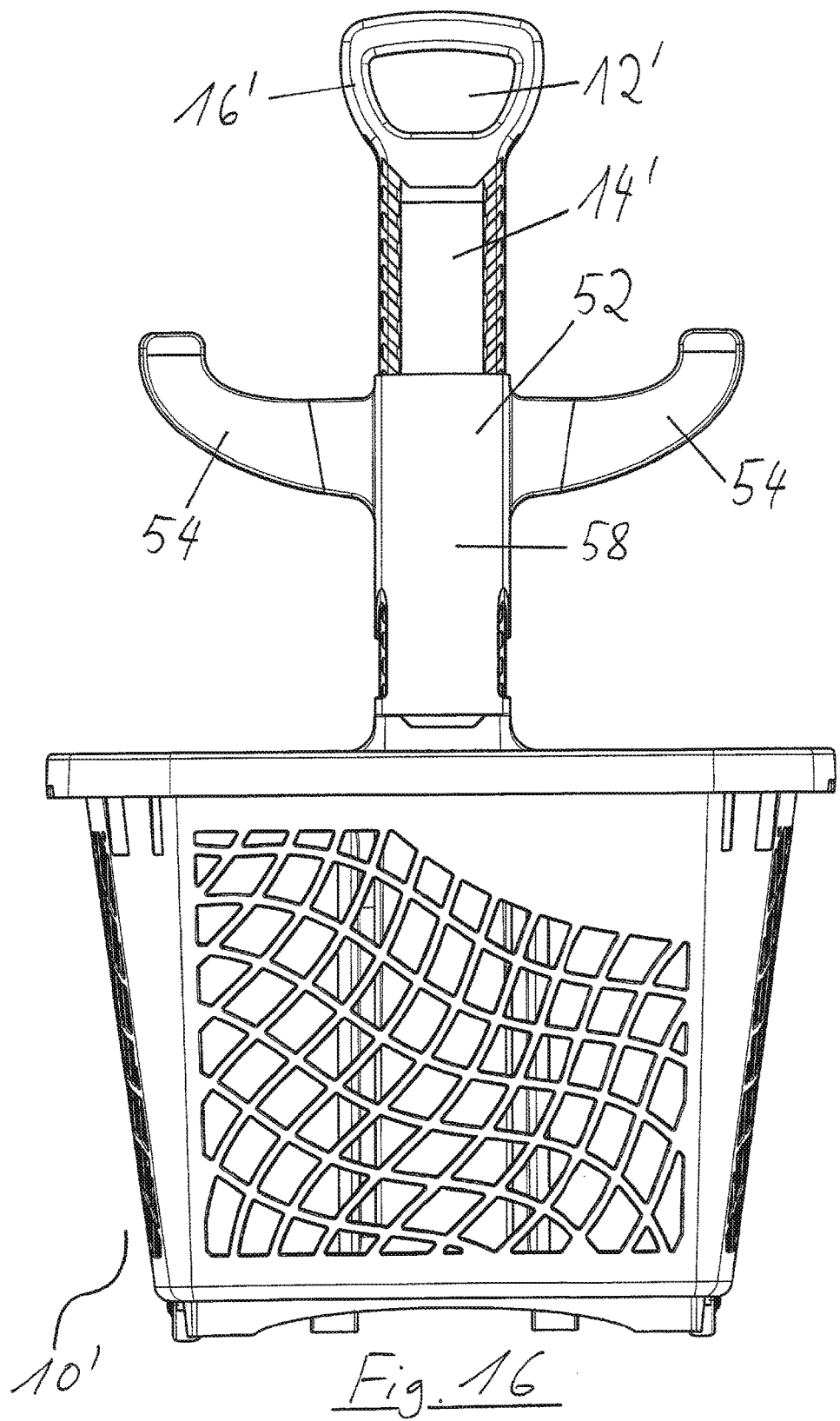
FIG. 16: shows a further view of the shopping basket according to FIG. 12 without an additional basket, but with the pull handle extended.

In addition, the shopping basket 10' has an attachment 52 threaded onto the pull handle 12', which, as can be seen, for example, from FIGS. 15 and 16, has two support arms 54 on which an additional basket 56 can be kept.

The attachment 52 is guided with a guide tunnel attachment 58 onto the guide rail 14' of the pull handle 12'.

In particular, it is positioned so that the guide rail 14' is carried through the guide tunnel 58.

As is evident from FIG. 15, in the lowered position of the pull handle 12', the handle 16' is lowered to the entrance of the attachment guide tunnel 58 and sits on its edge.

As is also evident from FIG. 16, in its extended position pull handle 12' is drawn out both from the guide tunnel 37' and the attachment guide tunnel 58.

Figure 5:
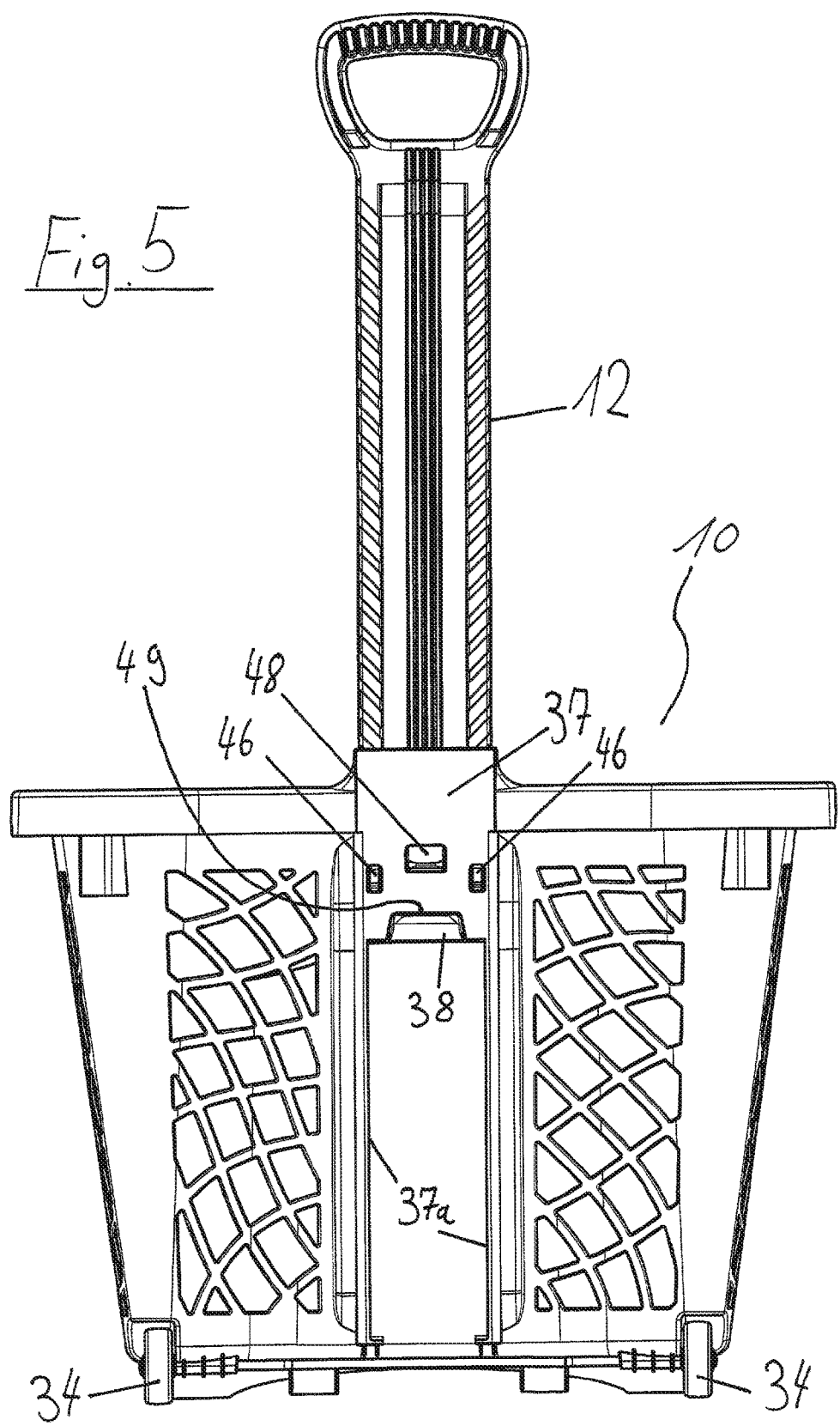
FIG. 5: shows a rear view of the shopping basket according to FIG. 1.

In the state shown in FIG. 16, the latching element 38' (see FIG. 14) analogously to the position shown in FIG. 5, strikes against molding 49' on the guide tunnel 37' and prevents complete removal of the pull handle 12'.

In this extended position (pull-out position) the snap elements 44' and 45' of the pull handle 12' are latched into the slots 46' and 48', so that the guide rail 14' is secured or latched stably in this position against inadvertently sliding back into the guide tunnel 37'. For a renewed insertion, the spring resistance of both of the spring bars 50', as well as the spring resistance of the convex outer wall of the guide tunnel 37', must be overcome, as the latching element 45' in the recess 48' is engaged.

Thus, it is possible even in the position shown in FIG. 16 not only to pull, but to also push the shopping basket 10'.

In the FIGS. 17 to 21 a further design example of a container 10" in accordance with the invention is shown, which shows all of the structural and functional characteristics as well as their associated benefits as for the design example described in FIGS. 1 to 11B.

In addition, however, an attachment rail 60 for attaching to the guide rail 14" and an additional basket 56" are provided.

The additional basket 56" is the same as the additional basket 56, as can be seen in connection with the design example shown in FIGS. 12 to 16.

In other words, it is possible to use the additional basket 56 also in connection with the design example shown in FIGS. 17 to 21 (and vice versa).

The attachment rail 60 has a middle bar 62, which is essentially the width b of the guide rail 14".

A side bar 64 rises on both long sides of the middle bar respectively. The middle bar 62 and the side bars 64 form a C-shaped profile.

At each side bar 64, a guide wing 66 is provided for additional support of the additional basket 56".

Figure 17:
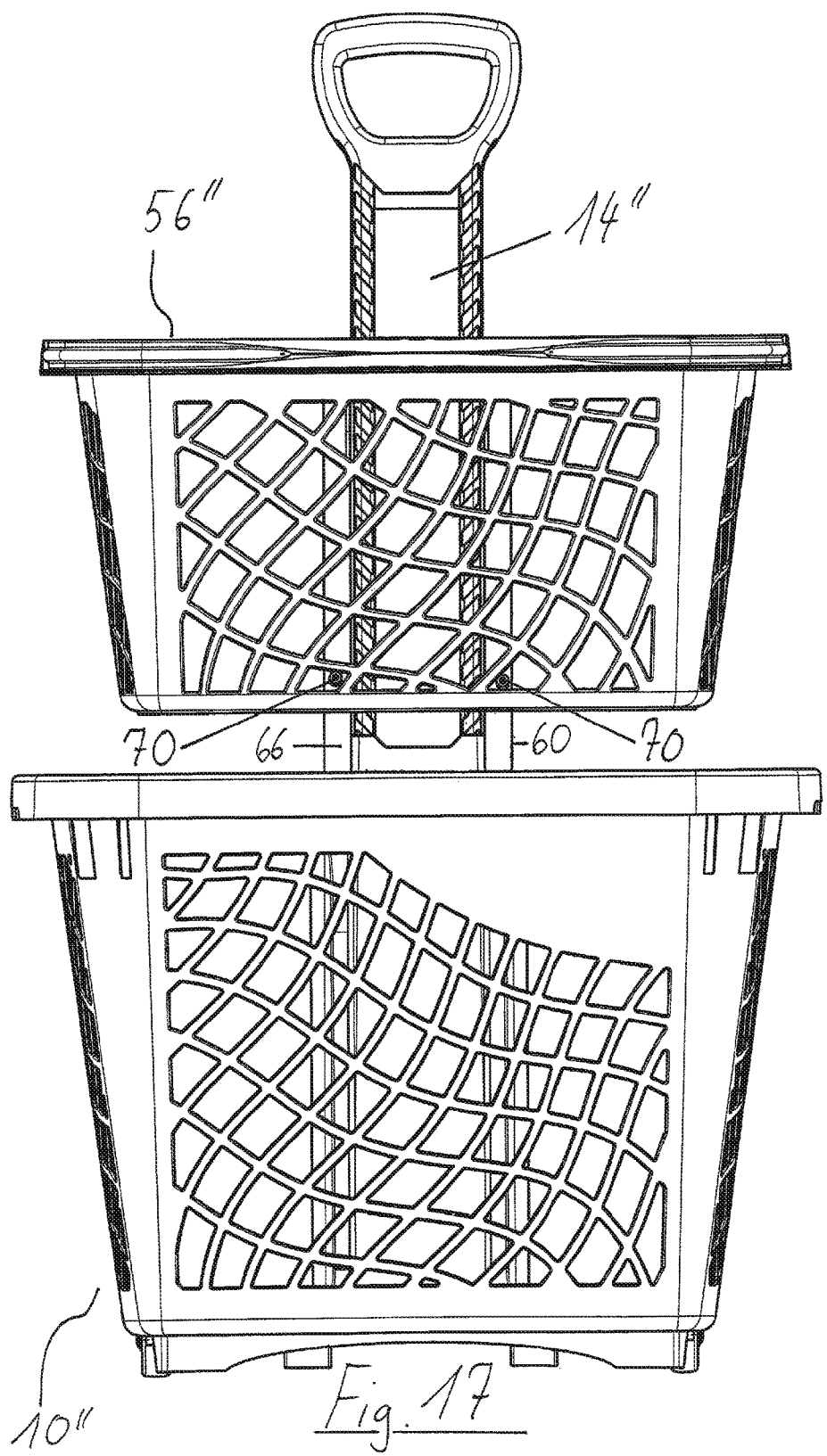
FIG. 17: shows a front view of a further design example of a shopping basket in accordance with the invention.
Figure 18:
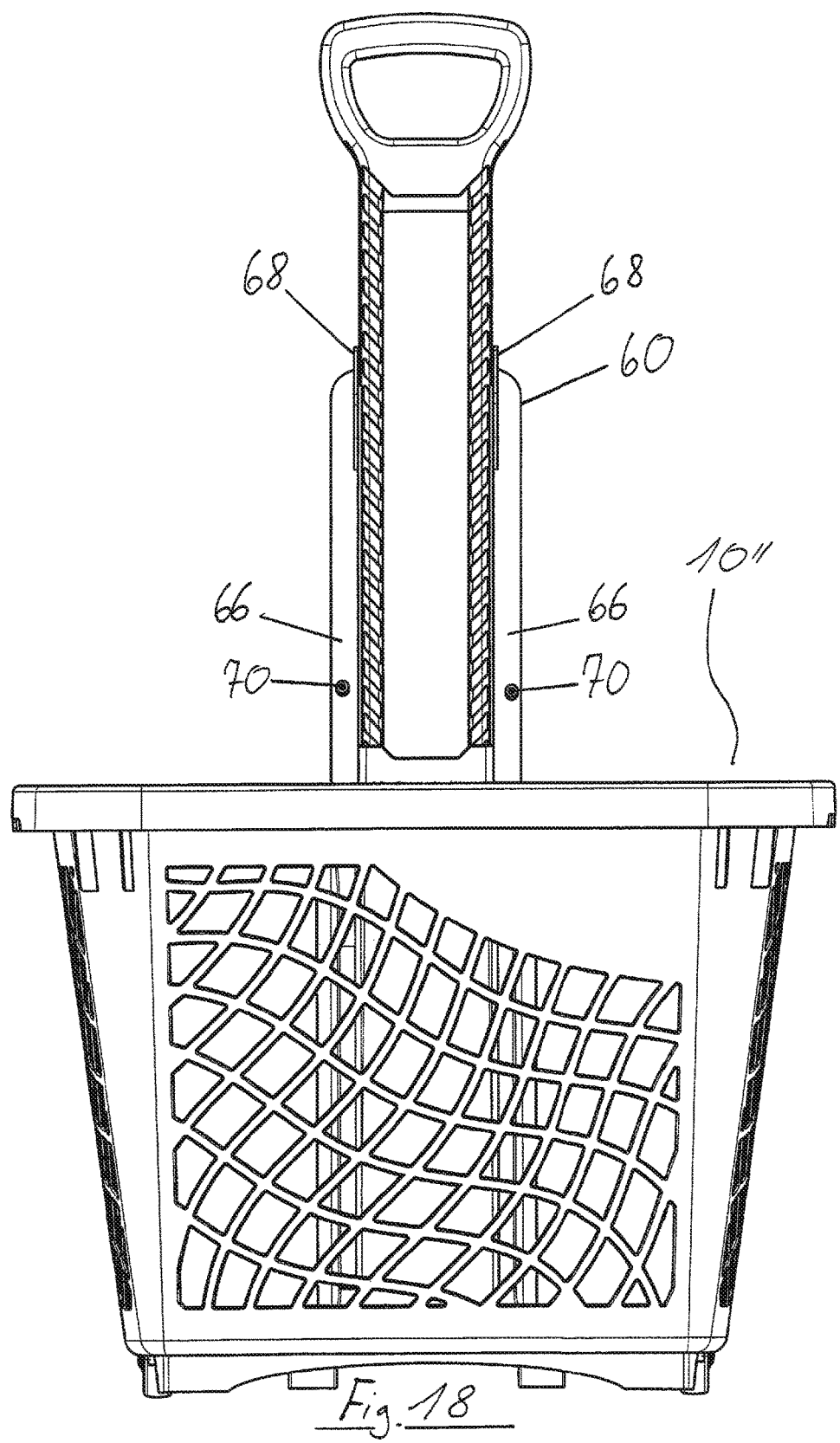
FIG. 18: shows a further front view of the shopping basket according to FIG. 17 without an additional basket.
Figure 19:
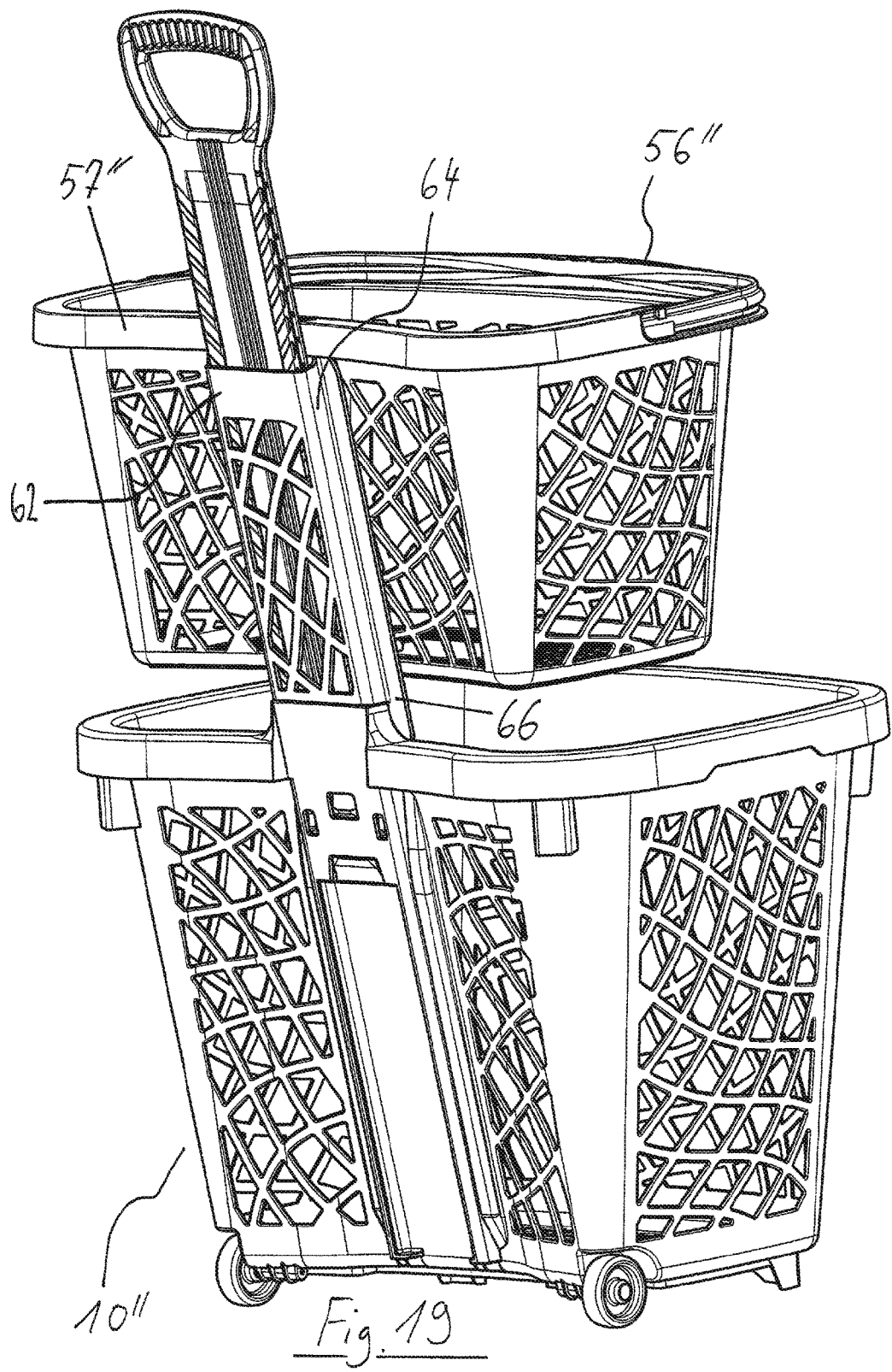
FIG. 19: shows a perspective rear view of the shopping basket according to FIG. 17.
Figure 20:
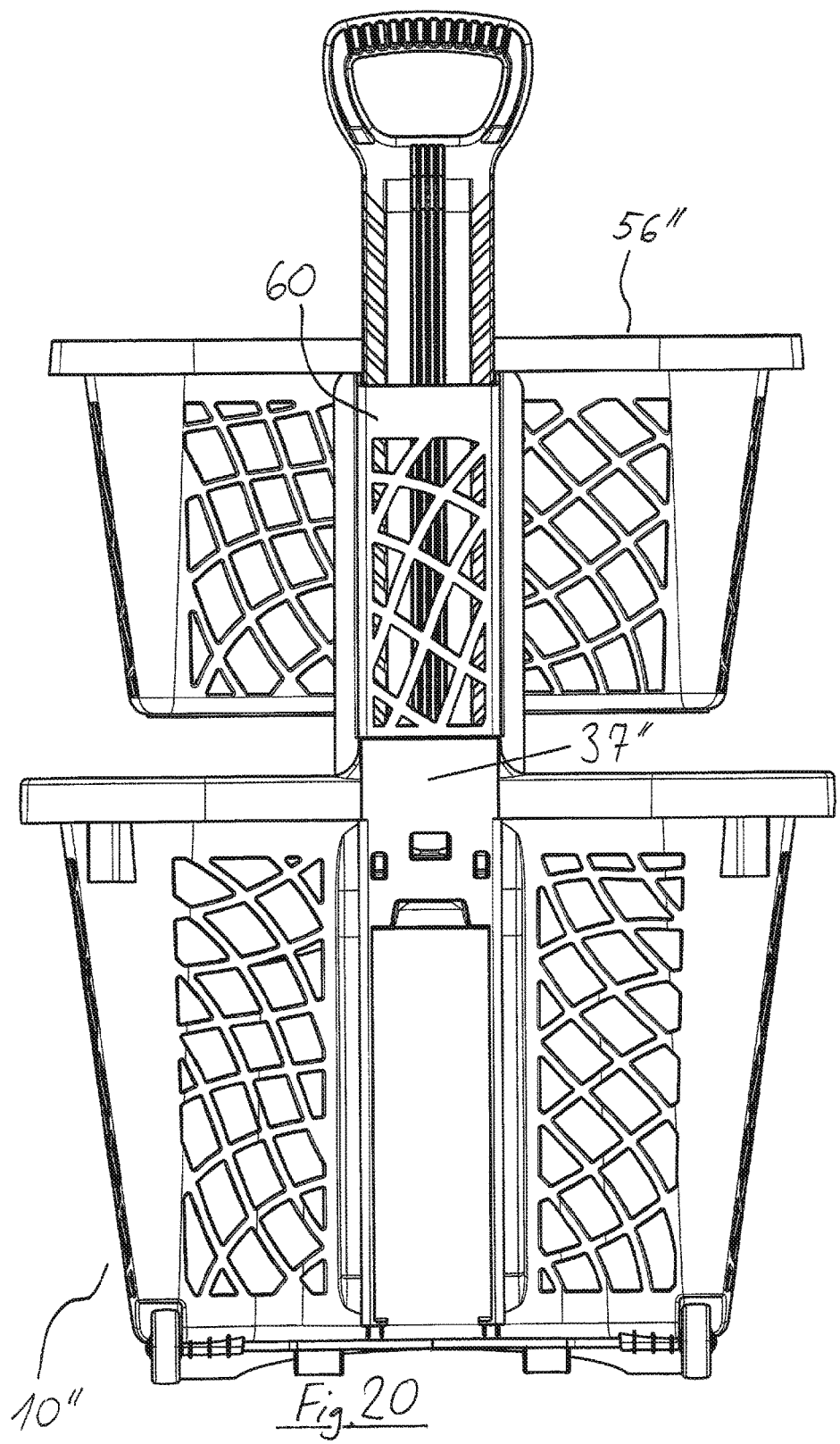
FIG. 20: shows a rear view of the shopping basket according to FIG. 17.
Figure 21:
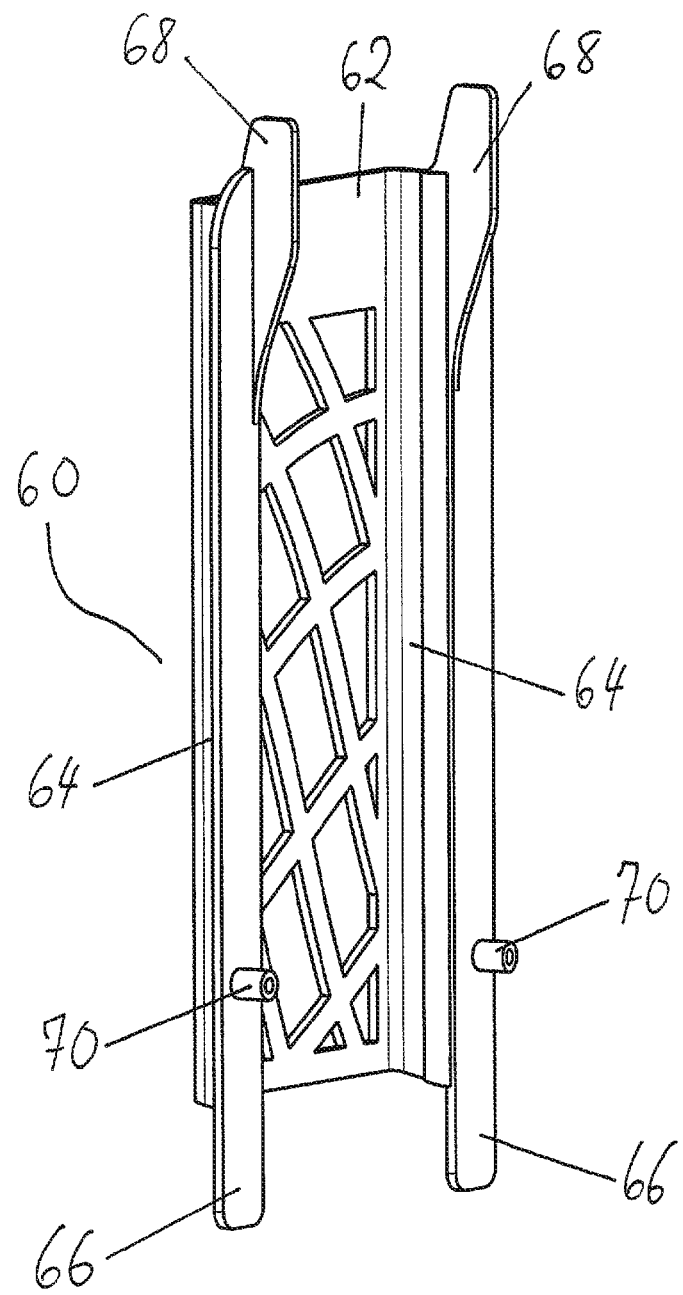
FIG. 21: shows a perspective view of the extension rail for the design example according to FIG. 17.

The attachment rail 60 can be clipped onto the guide rail 14" and in the configuration shown in FIG. 17 is clipped onto the extended guide rail 14". As a result, the middle bar 62 and the side bars 64 grip the guide rail 14".

Also, the side bars 64 on one side have each an attachment pin 68, on which the additional basket 56" with its edge profile 57" can be positioned or hooked.

In addition, guide pins 70 are provided, where a guide pin 70 is provided on each guide wing 66 in the part of the guide wing 66 facing away from the attachment pin 68. These guide pins 70 enter through the lattice structures of additional cage 56" and thus stabilize the extra basket 56" hung on the attachment pins 68.

The lower edge of the attachment rail 60 sits directly on the upper edge of the guide tunnel 37" (see FIG. 20), so that the weight force of the additional basket 56" can be transmitted to the shopping basket 10".

The invention claimed is:

1. A container with a base and a peripheral lateral wall adjoining the base, whereby the base and the lateral wall delimit an inner region of the container, whereby the container includes wheels or rollers, whereby the container also has a pull handle with a guide rail and a handle and whereby in a region of the lateral wall a guide tunnel to guide and at least in part, receive the guide rail of the pull handle is provided and whereby the guide tunnel has a cross-section with a curved or convex shape and whereby the guide rail has at least one latching element, which protrudes from an outer surface of the guide rail and in an assembled state of the pull handle prevents complete extraction of the guide rail from the guide tunnel, at least one slot in a wall of the guide tunnel opposite the lateral wall, and the at least one slot shaped to receive a respective latching element.

2. The container according to claim 1, wherein the guide rail is designed as a single piece.

3. The container according to claim 1, wherein the pull handle is designed as a single piece.

4. The container according to claim 1, wherein the pull handle and the guide rail are separate components.

5. The container according to claim 1, wherein the container is made of polypropylene.

6. The container according to claim 5, wherein the container is made of non-reinforced polypropylene.

7. The container according to claim 1, wherein the handle or the pull handle is made from fiber-reinforced plastic.

8. The container according to claim 1, wherein the at least one latching element is designed as a single piece.

9. The container according to claim 1, wherein the at least one latching element is formed in a wedge shape.

10. The container according to claim 1, wherein the guide rail has two broad sides with a width at least twice as large as a depth of the guide rail.

11. The container according to claim 10, wherein the at least one latching element is arranged on a broad side.

12. The container according to claim 11, wherein the guide tunnel has at least one slot in which the at least one latching element is latched.

13. The container according to claim 1, wherein, on the guide rail the at least one latching element is provided and the at least one latching element extending through slots in the guide tunnel preventing the pull handle from moving further into the guide tunnel.

14. The container according to claim 13, wherein the at least one latching element is arranged to be spring-loaded on a spring bar.

15. The container according to claim 14, wherein at least one further latching element is provided that is arranged to not be spring-loaded on the guide rail.

16. The container according to claim 1, wherein the guide tunnel has at least one molding, in which the at least one latching element is caught.

17. The container according to claim 1, wherein furthermore an attachment is provided which is threaded onto the pull handle and holds an additional basket.

18. The container according to claim 1, wherein the container is a shopping basket.

19. A container with a base and a peripheral lateral wall adjoining the base, whereby the base and the lateral wall delimit an inner region of the container, whereby the container includes wheels or rollers, whereby the container also has a pull handle with a guide rail and a handle and whereby in a region of the lateral wall a guide tunnel to guide and at least in part, receive the guide rail of the pull handle is provided and whereby the guide tunnel has a cross-section with a curved or convex shape and whereby the guide rail has at least one latching element, which protrudes from an outer surface of the guide rail and in an assembled state of the pull handle prevents complete extraction of the guide rail from the guide tunnel wherein furthermore an attachment rail that is clipped onto the guide rail holds an additional basket.

20. A container comprising:
a base and a peripheral lateral wall adjoining the base, whereby the base and the lateral wall delimit an inner region of the container,
wheels or rollers,
a guide rail and a handle,
at least one latch protruding from an outer surface of the guide rail,
a guide tunnel connected to the lateral wall and shaped to receive the guide rail, whereby the guide tunnel has a cross-section with a curved or convex shape,
at least one slot in a wall of the guide tunnel opposite the lateral wall, and the at least one slot shaped to receive a respective latch and walls of the at least one slot preventing movement of the latch within it.

* * * * *